United States Patent [19]

Ogden

[11] Patent Number: 4,945,771
[45] Date of Patent: Aug. 7, 1990

[54] INTEGRATED FLOW METER AND VACUUM GAUGE AND USE

[76] Inventor: Stanley D. Ogden, 1201 Scott Ave., #140, Clovis, Calif. 93612

[21] Appl. No.: 223,521

[22] Filed: Jul. 25, 1988

[51] Int. Cl.$^5$ .............................................. G01F 1/22
[52] U.S. Cl. .................................. 73/861.58; 73/714; 73/198
[58] Field of Search ...................... 73/198, 861.58, 714

[56] References Cited

U.S. PATENT DOCUMENTS

| | | |
|---|---|---|
| 2,638,582 | 5/1950 | Urso et al. |
| 3,218,853 | 11/1965 | Ongaro |
| 3,477,289 | 11/1969 | Wiebe ............................. 73/198 X |
| 3,554,031 | 1/1971 | Turner |
| 3,759,099 | 9/1973 | McGregor |
| 3,805,611 | 4/1974 | Hedland |
| 3,979,955 | 9/1976 | Schulte et al. |
| 4,112,757 | 9/1978 | Hayward |
| 4,389,901 | 6/1983 | Lake |

*Primary Examiner*—Herbert Goldstein
*Attorney, Agent, or Firm*—Philip A. Dalton

[57] ABSTRACT

A combination air flow and vacuum meter comprising a rigid transparent tubular housing having an inlet end, an opposite outlet end adapted for insertion into a central vacuum inlet or the like, a compression spring-mounted piston riding along an air flow controlling cone internal to the body, a vacuum guage mounted on the housing, and a reading scale on the housing that is calibrated with the spring and cone for indicating flow rate upon spring-loaded deflection of the piston. A plate or valve is attached to the housing and movable between open and closed positions to prevent air flow through the meter to measure vacuum in the closed position and to permit air flow through the meter to measure both vacuum and air flow rate in the open position.

5 Claims, 3 Drawing Sheets

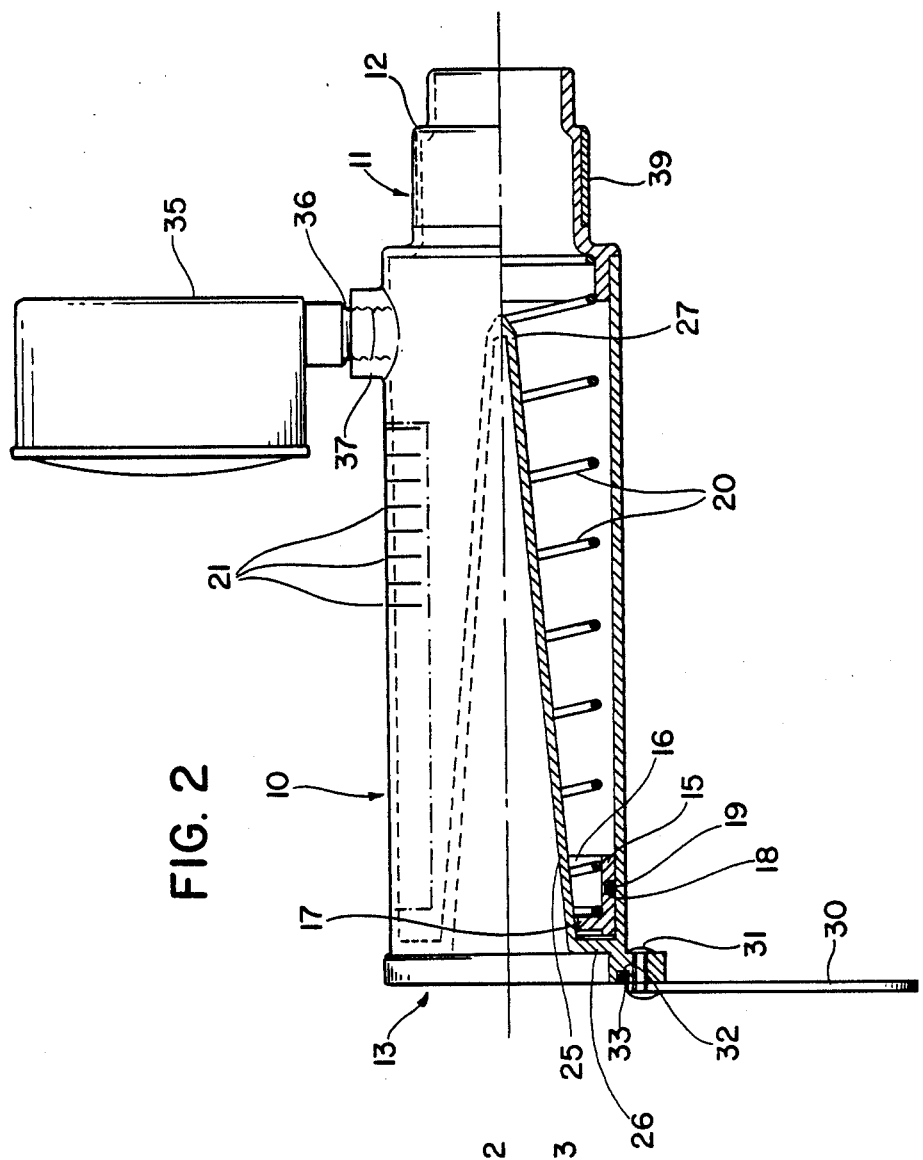
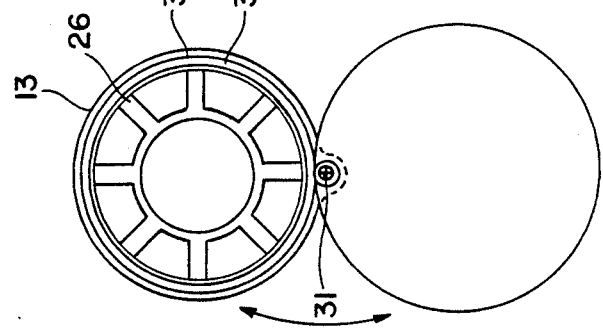

INTEGRATED FLOW METER AND VACUUM GAUGE AND USE

FIELD OF THE INVENTION

This invention relates to flow meters, and in particular to a portable combination air flow meter and vacuum gauge for wall inlets of central vacuum systems and the like, which permits direct, alternate reading of the rate of air flow and the vacuum level.

BACKGROUND OF THE INVENTION

Flow meters known in the prior art include those of the "piston-spring load" type are disclosed in U.S. Pat. Nos. 3,218,853; 3,805,611; 3,979,955 and 4,389,901. Other flow meters utilize a piston-magnet arrangement, for example U.S. Pat. No. 2,638,582, or a spring-loaded plate construction, for example U.S. Pat. No. 3,554,031. Still others disclose the use of a float structure disposed within a conically shaped conduit, for example, U.S. Pat. No. 3,759,099. Finally, U.S. Pat. No. 4,122,757 discloses a fluid flow meter utilizing a venturi-shaped throat and spring-loaded sliding member movable inside a cylinder in response to fluid flow pressure.

With one exception, the foregoing prior art devices all suffer from a primary disadvantage in that they measure only fluid flow rate, while permanently installed in a pipeline, i.e., they cannot be easily converted to use or used to measure vacuum air flow rate as well in a portable configuration. In contrast, the present invention provides a highly sensitive fluid flow meter which allows direct reading of both air flow rate and vacuum. In addition, this meter is portable and can be read in any position horizontal or vertical. Although U.S. Pat. No. 3,979,955 discloses a fluid flow meter which can be used in any flow direction, it cannot be used to measure both air flow and vacuum.

There are other objects and advantages of the present invention, and those will become apparent upon reading the following description in light of the accompanying drawing.

SUMMARY OF THE INVENTION

The present invention relates to a combination air flow meter and vacuum gauge having a rigid, tubular housing of transparent material with an inlet and an outlet adapted for insertion into an inlet valve of a central vacuum unit, a piston member having a central bore and being disposed within the housing for reciprocation along its longitudinal axis, a precalibrated spring located within the housing to move the piston member, a reading scale on the housing correspondingly calibrated with the spring for indicating flow rate upon spring-loaded deflection of the piston member toward the housing outlet, a conical member extending through the central bore of the piston member and disposed longitudinally within housing having a perforated base covering the housing inlet, a tip projecting toward the outlet and a cross-sectional area selected to restrict air flow through the housing to correspondingly calibrated rates on the reading scale to spring deflection rates, valve means attached to the housing inlet base and movable between closed and open positions to selectively prevent air flow and permit air flow through the meter and a vacuum gauge (either integral or removable) communicating with the interior of the housing for measuring open vacuum when the valve means is moved to the open position, and sealed vacuum when the valve means is moved to the closed position.

Provided also are these several additional, related features. The outlet of the housing preferably carries at least one electrical conductor for activating the inlet valve of a central vacuum cleaning system. Further, means for sealing the valve to the base to prevent vacuum air leakage into the base when the valve is in closed position and indicia means for matching piston member deflection level against the reading scale are provided. The sealing means are constituted by an 0-ring disposed within a concentric recess in the base and the indicia means are constituted by a second 0-ring disposed within a concentric recess in the piston member to act as a highly visible ring inside the transparent housing.

Finally, the outlet of the meter housing may be formed of steps of differing predetermined diameters for insertion into inlet valves of central vacuum units or vacuum cleaning hose cuffs having different diameters and the meter may be constituted of a fourpiece unit—the housing and conical member forming one integral piece of the unit, the discharge end forming another piece and the spring and piston member forming the remaining two pieces of the unit.

As a result of the aforementioned arrangements and others which will appear from reading the detailed description, an easy to use combination vacuum air flow meter and vacuum gauge not heretofore available is provided.

BRIEF DESCRIPTION OF THE DRAWINGS

FIG. 2 is a side elevation, partially in section, of the flow meter of the present invention;

FIG. 3 is an end elevational view of the meter shown in FIG. 1;

FIG. 4 is a power chart which provides calculated power in air watts as a function of air flow and vacuum.

DETAILED DESCRIPTION OF THE PREFERRED EMBODIMENT

Figure 1:
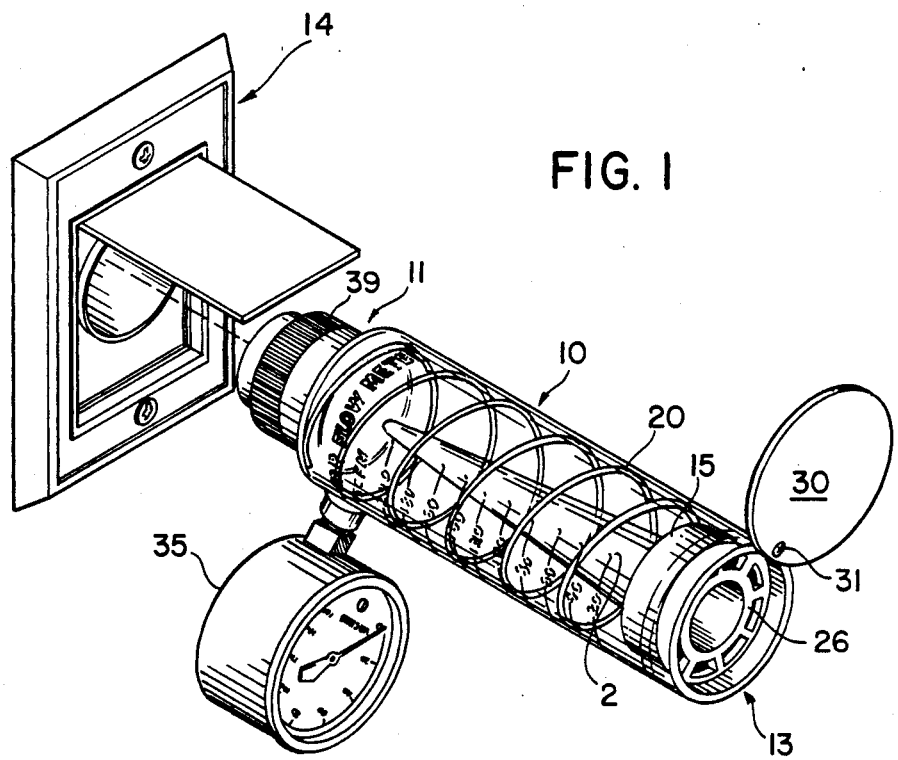
FIG. 1 is a perspective view of the flow meter of the present invention.

Referring to FIG. 1, the flow meter of the present invention has a housing 10 of rigid, transparent material for example, plastic. Housing 10 has an outlet 11 and an inlet 13. Outlet 11 is specifically adapted for insertion into an inlet valve of a central vacuum unit of the type found in homes and office buildings and the like. Housing 10, as already noted, is transparent; it is tubular in structure, hence structures located within the housing can be readily seen.

As seen in FIG. 2, within housing 10 is piston member 15, movably disposed for reciprocation along the longitudinal axis of housing 10 and having a central bore 16. A precalibrated spring 20 is likewise located within housing 10 and extends the entire length of the housing from outlet 11 to inlet 13. Spring 20 has a diameter enabling it to rest at one end within the central bore, 16, of piston member 15. To accomplish this resting, piston member 15 is formed having an inner lip 17 in contacting relationship with the end of spring 20. Upon movement of piston member 15 to the right, inner lip 17 presses against the end of spring 20, causing its compression. Reading scale 21, calibrated in cfm or other selected flow rate, is located longitudinally on the central portion of housing 10, and is correspondingly calibrated with spring 20 for indicating flow rate upon spring-loaded deflection of piston member 15 upon compression of spring 20 in a manner to be further described below.

Conical member 25 is disposed longitudinally within housing 10, extending through central bore 16 of piston member 15. Conical member 25 has a perforated base 26 which covers inlet 13 of housing 10 and a conical body or tip 27 projecting toward housing outlet 11. Conical member 25 has a cross-sectional area selected to restrict air flow through housing 10 to correspondingly calibrated rates on reading scale 21 to spring deflection rates. Consequently, the compression of spring 20 by the displacement of piston member 15 in response to the force of vacuum air flow is calibrated to correspond to reading scale 21 by virtue of the progressively increasing crosssectional area between conical member 25 from base 26 to tip 27 and the wall of housing 10, as best seen in FIG. 1. As a result, the position of the piston along the scale indicates the rate of air flow through the housing 10 from the inlet to the outlet thereof and into the inlet valve 14. The perforations in base 26 permit air flow through the housing when a measurement of air flow rate is desired.

Valve means 30 is attached to base 26 of conical member 25 and movable between closed and open positions in order to alternately prevent and permit air flow through housing 10. Accordingly, as can be seen from FIG. 1, valve means 30 in one embodiment comprises a plate 30 attached to base 26 by rivet 31. By rotating plate 30 to the closed position covering perforated base 26, air flow through housing 10 is shut off and sealed vacuum can be measured by the vacuum gauge 35 attached to housing 10. When plate 30 is moved to its open position not covering perforated base 26, air flow through housing 10 is permitted and air flow rate can be measured.

Vacuum gauge 35 measures "open" vacuum when plate 30 is moved to its open position, as well as "sealed" vacuum when plate 30 is moved to its closed position. Vacuum gauge 35 may be integral with housing 10 or may be removably mounted on housing 10. In the latter case, gauge 35 is provided with nozzle 36, which is removably inserted into receptacle 37 on housing 10. Upon removal of gauge 35, in case only air flow rate measurements are desired, plug 38 is provided to seal receptacle 37.

My air flow meter utilizes the principle of a variable orifice area with moving donut-shaped piston 15 inside of clear plastic housing 10. Fluid flow creates a differential pressure which causes piston 15 to move to a point of equilibrium between the fluid flow pressure and helical compression spring 20. The housing 10 is graduated in "cubic feet per minute" of air flow which is "read" directly from the position of piston 15 along scale 21. As indicated, vacuum gauge 35 can also be connected to the side of the housing near the suction end to measure the vacuum under air flow conditions, and flat plate 30 can be used to close off the inlet air flow to measure the sealed vacuum with no air flow. By knowing the vacuum under air flow conditions and the air flow, the "power" of a vacuum system can be calculated:

$$P = \frac{VQ}{8.5}, \text{ where}$$

P = power (air watts)
V = vacuum (inches water lift)
Q = air flow (cubic feet per minute).

A power "chart" as shown in FIG. 4 can be used with the device so no calculations will have to be made.

The meter of the present invention also carries at least one electrical ring conductor for activating the central vacuum meter when the meter is inserted into the central vacuum unit's inlet valve 14; that electrical conductor 39, as is shown best in FIG. 1, is carried by outlet 11 of housing 10. Outlet 11 may also be formed of steps of differing, predetermined diameters, thereby permitting insertion of outlet 11 into the hose cuffs of vacuum cleaning hoses also having differing, predetermined diameters. One example of this is shown in FIG. 1 where outlet 11 has step 12, thus permitting the meter to be inserted into vacuum hose cuffs having the diameters of portions 12a and 12b, respectively.

The meter of the present invention may also be provided with a means for sealing plate 30 to base 26 of the housing to prevent air leakage from the base when the plate is in its closed position. In that case, in its preferred embodiment, base 26 is provided with concentric recess 32 wherein is disposed 0-ring 33. Upon movement of plate 30 to the closed position, sealing engagement of base 26 with plate 30 is accomplished.

In a further embodiment, piston member 15 may also be provided with an indicia means, allowing for more accurate readings from reading scale 21. In that case, piston member 15 is provided with a concentric recess 18 for receipt of a second O-ring, 19, preferably black in color, which is disposed within the recess. Upon movement of piston member 15, O-ring 19 will be brought in line with the gradations of reading scale 21, providing easy reading of the rate off the scale and thereby increasing the accuracy of the measurements.

In operation, outlet 11 of housing 10 is inserted into an inlet valve of a central vacuum unit. Electrical conductor 39, which is carried by outlet 11 step 12b, closes the circuit across the electrical contacts in the central vacuum unit's inlet valve 14, causing the vacuum unit to be activated. If plate 30 is in its open position, air will flow through housing 10 in a linear manner, entering the meter through perforated base 26 and exiting the meter through outlet 11. The rate of air flow is measured by the distance of displacement of piston member 15, and such distance is read from reading scale 21. If measurement of vacuum is desired, plate 30 is placed in its closed position, covering the holes of perforated base 26 and the "closed" vacuum is measured by means of vacuum gauge 35 mounted on housing 10. The "open" vacuum is measured with the plate 30 in the open position.

What is claimed is:

1. A combination air flow and vacuum meter comprising:
    a rigid, tubular housing of transparent material having an outlet adapted for insertion into an inlet valve of a central vacuum unit and having an inlet open to atmosphere, said outlet carrying at least one electrical conductor for activating said inlet valve;
    a piston member movably disposed within said housing for reciprocation along the longitudinal axis thereof, said piston member having a central bore;
    a precalibrated spring located within said housing urging said piston member toward said inlet;
    a reading scale on said housing calibrated with said spring for indicating air flow rate upon deflection of said spring-loaded piston member;

a conical member extending through said central bore of said piston member and disposed longitudinally within said housing, said conical member having a perforated base covering said inlet, a tip projecting toward said outlet, and a cross sectional area selected to restrict air flow through said housing to correspondingly calibrated rates on said reading scale to spring deflection rates;

valve means attached to said base of said conical member and movable between closed and open positions to selectively prevent or allow air flow through said meter, said base including an O-ring for sealing against said valve means when said valve means is in the closed position;

a vacuum gauge communicating with the interior of said housing for measuring sealed or open vacuum when said valve means is moved to said closed or open position, respectively; and said piston member including O-ring indicia means for matching piston member deflection level against said reading scale.

2. A combination air flow and vacuum meter comprising:

a rigid, tubular housing of transparent material having an outlet adapted for insertion into an inlet valve of a central vacuum unit and having an inlet open to atmosphere, said outlet carrying at least one electrical conductor for activating said inlet valve;

a piston member movably disposed within said housing for reciprocation along the longitudinal axis thereof, said piston member having a central bore;

a precalibrated spring located within said housing urging said piston member toward said inlet;

a reading scale on said housing calibrated with said spring for indicating air flow rate upon deflection of said spring-loaded piston member;

a conical member extending through said central bore of said piston member and disposed longitudinally within said housing, said conical member having a perforated base covering said inlet, a tip projecting toward said outlet, and a cross sectional area selected to restrict air flow through said housing to correspondingly calibrated rates on said reading scale to spring deflection rates;

valve means attached to said base of said conical member and movable between closed and open positions to selectively prevent or allow air flow through said meter, said base including an O-ring for sealing against said valve means when said valve means is in the closed position;

a vacuum gauge communicating with the interior of said housing for measuring sealed or open vacuum when said valve means is moved to said closed or open position, respectively;

said piston member including indicia means for matching piston member deflection level against said reading scale; and said indicia means comprising a second O-ring and said piston member including a concentric recess in which said second O-ring is disposed.

3. The meter of claim 2, wherein said meter comprises a four-piece unit, said housing and said conical member comprising one integral piece of said unit, the discharge end comprising another piece of said unit, and said spring and said piston member comprising the remaining two pieces of said unit.

4. The meter of claim 2, wherein said outlet of said housing comprises steps of differing, predetermined diameters for insertion into inlet valves of central vacuum units or vacuum cleaning hose cuffs having differing predetermined diameters.

5. In a method for measuring power in air watts from air flow rate and vacuum level, the improvement comprising measuring air flow rate and vacuum level using the same device, as follows:

providing a meter having a vacuum gauge and an air flow meter controlled by a closable valve, the air flow meter having a piston member the position of which indicates air flow rate;

inserting said meter into the inlet valve of a central vacuum unit and placing the valve of said meter in the open position; whereby when said valve means is in said open position, said vacuum gauge indicates open vacuum magnitude and the positions of said piston member corresponds to air flow rate;

using said meter, measuring air flow rate and open vacuum; and determining power in air watts from the air flow rate and open vacuum measurements.

* * * * *